(12) United States Patent
Nakahara

(10) Patent No.: US 11,314,019 B2
(45) Date of Patent: Apr. 26, 2022

(54) CAPILLARY-TYPE LENS ARRAY AND CAPILLARY-TYPE LENS ARRAY COMPOSITE COMPONENT

(71) Applicant: NAKAHARA OPTO-ELECTRONICS LABORATORIES, INC., Mito (JP)

(72) Inventor: Motohiro Nakahara, Mito (JP)

(73) Assignee: NAKAHARA OPTO-ELECTRONICS LABORATORIES, INC., Mito (JP)

( * ) Notice: Subject to any disclaimer, the term of this patent is extended or adjusted under 35 U.S.C. 154(b) by 183 days.

(21) Appl. No.: 16/620,238

(22) PCT Filed: May 16, 2018

(86) PCT No.: PCT/JP2018/018856
§ 371 (c)(1),
(2) Date: Dec. 6, 2019

(87) PCT Pub. No.: WO2019/044055
PCT Pub. Date: Mar. 7, 2019

(65) Prior Publication Data
US 2021/0325611 A1 Oct. 21, 2021

(30) Foreign Application Priority Data
Aug. 31, 2017 (JP) .............................. JP2017-167808

(51) Int. Cl.
*G02B 6/32* (2006.01)
*G02B 3/00* (2006.01)
*G02B 6/34* (2006.01)

(52) U.S. Cl.
CPC ............. *G02B 6/32* (2013.01); *G02B 3/0037* (2013.01); *G02B 3/0087* (2013.01); *G02B 6/34* (2013.01); *G02B 2003/0093* (2013.01)

(58) Field of Classification Search
CPC ...... G02B 6/32; G02B 3/0037; G02B 3/0087; G02B 6/34; G02B 2003/0093; G02B 3/00
See application file for complete search history.

(56) References Cited

U.S. PATENT DOCUMENTS

| | | | |
|---|---|---|---|
| 2003/0128437 A1* | 7/2003 | Sato ........................ | H01S 5/227 359/641 |
| 2014/0185991 A1* | 7/2014 | de Jong ................... | G02B 7/02 359/652 |
| 2014/0205236 A1* | 7/2014 | Noguchi .............. | G02B 6/2835 385/33 |

FOREIGN PATENT DOCUMENTS

| | | | | |
|---|---|---|---|---|
| JP | 2002-311283 | | 10/2002 | |
| JP | 2003-202450 | | 7/2003 | |
| JP | 2005-250183 | | 9/2005 | |
| JP | 2014-503081 | * | 2/2014 | ............... G02B 6/04 |
| WO | 2012/088361 | | 6/2012 | |

OTHER PUBLICATIONS

International Search Report dated Jul. 31, 2018 in corresponding PCT International Patent Application No. PCT/JP2018/018856, 2 pages.

* cited by examiner

*Primary Examiner* — Ellen E Kim
(74) *Attorney, Agent, or Firm* — Ohlandt, Greeley, Ruggiero and Perle, LLP

(57) ABSTRACT

A capillary-type lens array having an inorganic glass around a graded index lens, in which a plurality of the graded index lenses and the inorganic glass are physically fused.

11 Claims, 13 Drawing Sheets

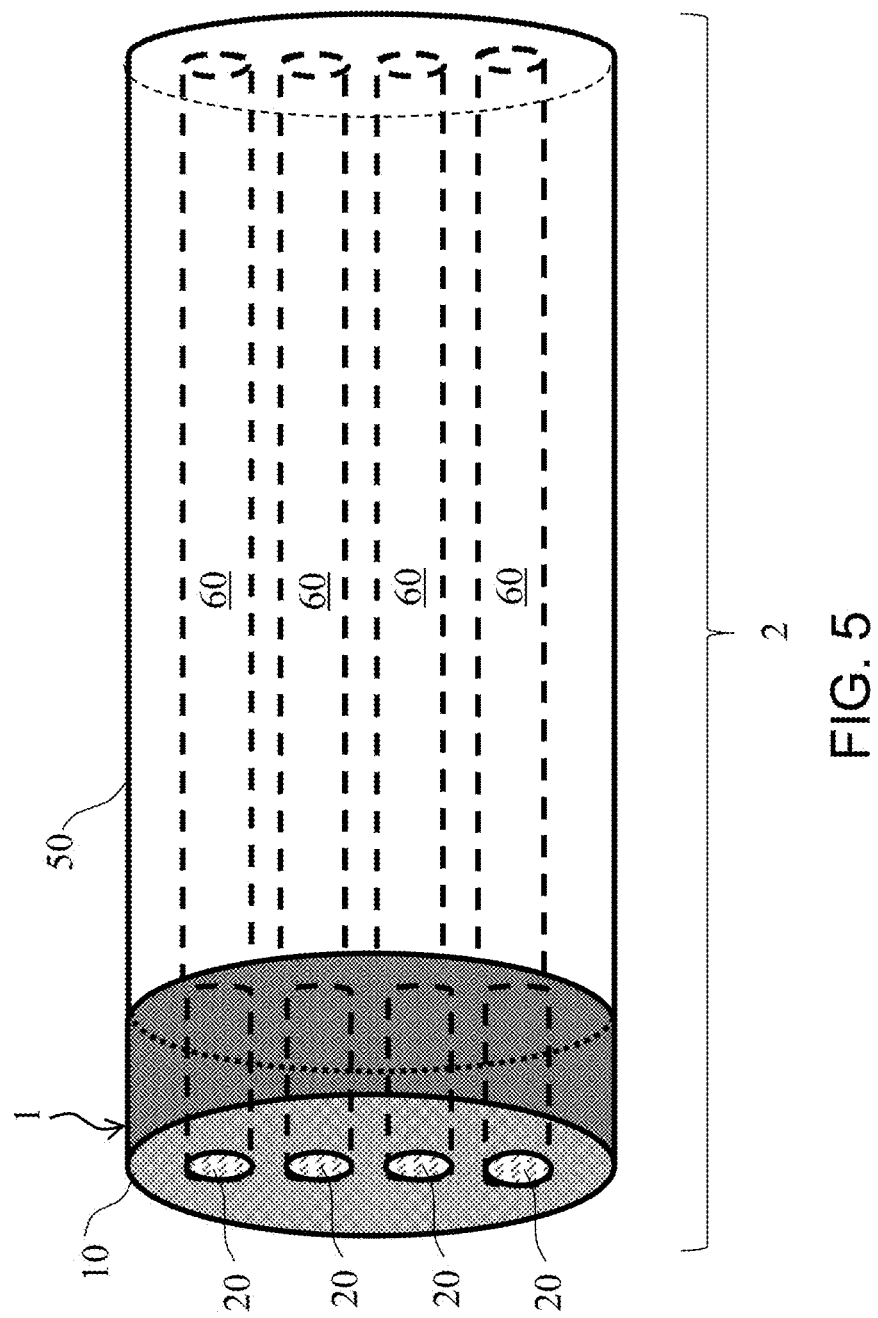

CAPILLARY-TYPE LENS ARRAY AND CAPILLARY-TYPE LENS ARRAY COMPOSITE COMPONENT

BACKGROUND

1. Field of the Disclosure

The present disclosure relates to a lens array including a plurality of lenses.

2. Discussion of the Background Art

In recent years, as represented by silicon photonics, miniaturization of optical functional components has been progressing for power saving and high-density packaging. In accordance with this, for optical connection components that connect optical functional components with output optical fibers, higher component accuracy and connection accuracy are required as compared with conventional quartz-based optical components.

As one that is used as an optical connection component having a collimating function, there is a graded index lens having a cylindrically symmetric distribution in which a refractive index decreases from a central axis toward a periphery with approximately the square of a distance. The graded index lens is used in a wide range of fields, including optical communication fields, copying machines, endoscopes, and the like, and has a feature of being easy to be connected to other optical components since a component end face is a flat surface.

However, due to the characteristics of the graded index lens, a lens shape is cylindrical, and it is necessary to produce with a positional accuracy of the graded index lens of several μm or less, in order to obtain desired lens characteristics. Therefore, when being arrayed to be used, the graded index lens is used with an end face polished, after cylindrical lenses are arranged on a glass substrate having a V-groove or inserted into a glass capillary having a plurality of cylindrical holes.

In connection between the conventional quartz-based optical component and the graded index lens, since a mode field diameter is about 10 μm, there has been no practical problem as long as a required connecting accuracy and a distance accuracy between the lenses of the collimating graded index lens is about 1 μm. However, in connection between silicon photonics and the graded index lens, an accuracy of 0.5 μm or less is required since a mode field of the silicon photonics is equal to or less than 1/20 of that of the quartz-based optical component.

Conventional optical connection components are arrayed by bonding and fixing a graded index fiber with an adhesive, with use of an aligning member such as a V-groove or a capillary. In a case of assembling components by this method, since a positional accuracy varies for each component and positional variations occur, a product yield may be reduced for silicon photonics components which requires 0.5 μm or less assembling accuracy.

In addition, it is possible to relatively easily connected an optical component in which a graded index fiber is joined to a front end of an optical fiber with a fusion splicer and the like, but in a case of connecting it to other optical component, it becomes necessary to fix it to an another optical component such as a fiber array and a glass capillary with an adhesive or the like, and then polish. This has become a factor leading to an increase in manufacturing cost and a decrease in component accuracy.

In addition, as an endoscope used for observation of deep brains, an endoscope using single-core graded index lens has been mainly used conventionally, but there has been a need for an endoscope using a plurality of graded index lenses in order to achieve enlargement of a visual field region, simultaneous irradiation of excitation light, and the like. However, for the application of the plurality of graded index lenses to an endoscope, it has been necessary to use an adhesive having a minimally invasive in a living body, and to reduce a bundled diameter to a size that does not affect the living body.

SUMMARY

Technical Problem

An object of the present disclosure is, in a lens array including a plurality of graded index lenses having a collimating function, to enhance workability in connecting to other optical components and to improve a positional accuracy and variation of the lens array.

Solution to Problem

A capillary-type lens array according to the present disclosure includes a plurality of graded index lenses and an inorganic glass capillary surrounding each graded index lens.

In the present disclosure, in the same manner as capillary production, a glass capillary-type lens array containing an optical fiber having a lens function as a graded index lens is obtained by making a through holes in advance in an inorganic glass base material, and by inserting base material having a collimating function into each through hole, and using the same heating and drawing technology as that in capillary production. Therefore, in the capillary-type lens array according to the present disclosure, a plurality of graded index lenses and inorganic glass of the capillary are physically fused.

In particular, in the present disclosure, a plurality of optical connection components having a collimating function can be easily obtained by arranging and embedding a plurality of base material having a collimating function in an inorganic glass base material at appropriate intervals, and by drawing at above softening temperature or higher.

Furthermore, the present disclosure does not include a step of arranging an optical fiber having a collimating function on an aligning member, in contrast to a method of producing with use of a conventional aligning member. Therefore, there is no deterioration in a positional accuracy associated with mounting and no variation due to workability even when the capillary is a rigid body of the inorganic glass with an outer diameter of 0.5 mm or more to 5 mm or less, and there are advantages of high mounting accuracy and small variation.

The plurality of graded index lenses have a pitch length according to usages, and $((1/2) \times n)$ pitch and $((1/4)+n)$ pitch can be exemplified. Note that "n" is a positive integer. These pitch lengths can be any value by combining with other optical components. Further, the pitch length or a refractive index distribution constant of any of the plurality of graded index lenses may be different from that of another graded index lens among the plurality of graded index lenses.

In addition, a capillary-type lens array composite component according to the present disclosure includes: the capillary-type lens array of the present disclosure; and an inorganic glass capillary having a plurality of holes corresponding to the plurality of graded index lenses of the capillary-type lens array, and joined to an end face of the capillary-type lens array such that a position of an end face of the plurality of graded index lenses is coincident with a position of the plurality of holes. Thus, when the capillary-type lens array according to the present disclosure is connected to one in which an optical fiber is inserted to an inorganic glass capillary hole produced in a similar manufacturing process, the connection can be easily carried out with fusion or adhesive.

Here, in a capillary-type lens array composite component according to the present disclosure, an optical fiber may be disposed in the hole of the capillary. In addition, in the capillary-type lens array composite component according to the present disclosure, an optical component having a direction changing function such as a prism may be disposed between the capillary-type lens array and the capillary.

Note that the individual disclosures above can be combined as much as possible.

Advantageous Effects of Invention

According to the present disclosure, in a lens array including a plurality of graded index lenses having a collimating function, it is possible to enhance workability in connecting to other optical components and to improve a positional accuracy and variation of the lens array.

BRIEF DESCRIPTION OF DRAWINGS

FIG. 5 shows an example of a configuration of a capillary-type lens array composite component in which a capillary is combined with the capillary-type lens array.

DETAILED DESCRIPTION OF THE PREFERRED EMBODIMENT

Figure 1:
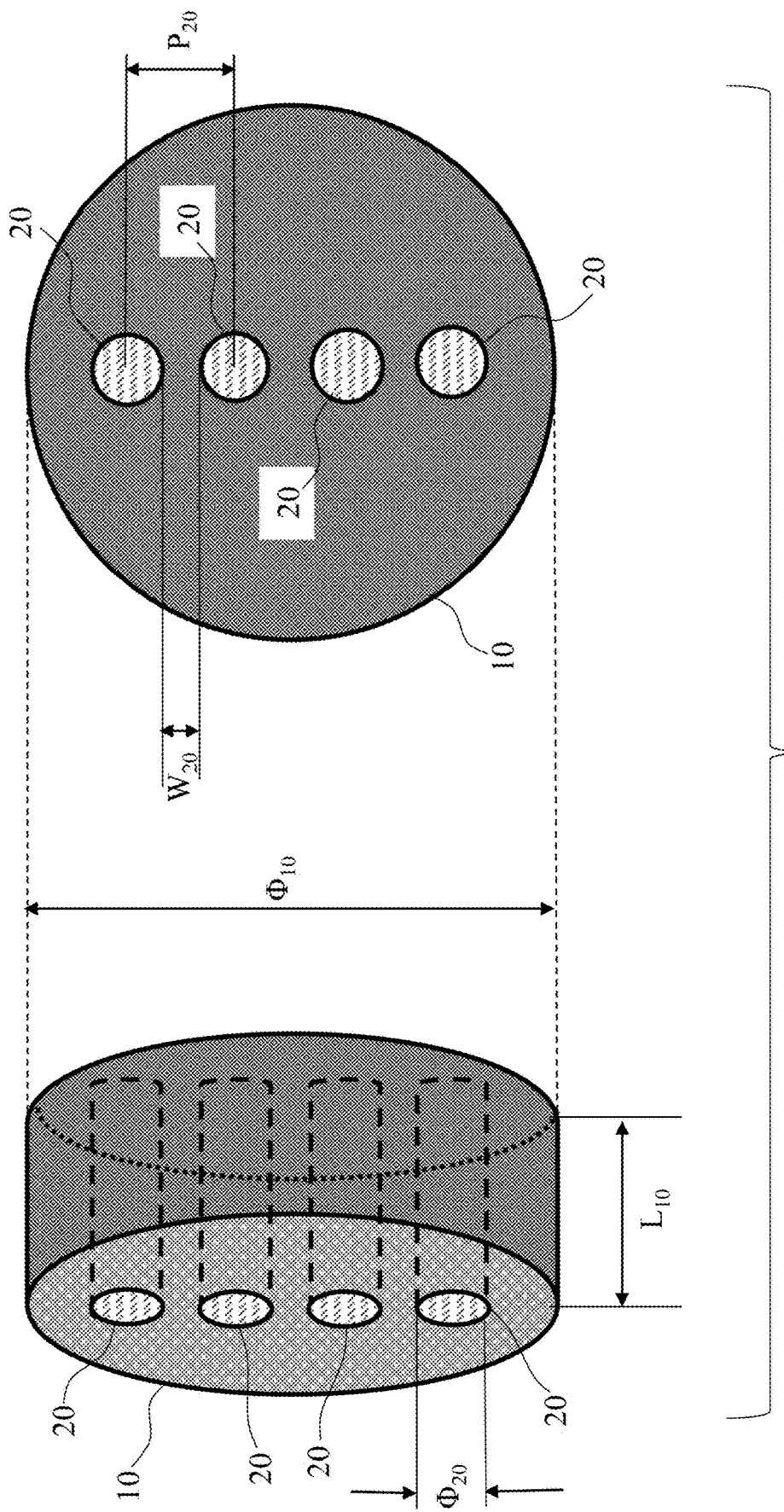
FIG. 1 shows an example of a configuration of a capillary-type lens array.

Hereinafter, embodiments of the present disclosure will be described in detail with reference to the drawings. It should be noted that the present disclosure is not limited to the embodiments shown below. These embodiments are merely examples, and the present disclosure can be implemented in forms applied with various modifications and improvements on the basis of the knowledge of those skilled in the art. Note that, in the present specification and drawings, mutually the same components are denoted by the same reference numerals.

First Embodiment

FIG. 1 is a view showing a form of a capillary-type lens array according to the present embodiment. A capillary-type lens array 1 of the present embodiment includes a capillary body part 10 and a graded index lens 20. Here, the capillary body part 10 is made of inorganic glass and covers around the graded index lens 20. The graded index lens 20 has a collimator function. The graded index lens 20 may be a graded index optical fiber.

The graded index lens 20 is fixed to the capillary body part 10. In the present disclosure, the capillary body part 10 and the graded index lens 20 are produced by heating and melting of base materials of both. Therefore, a main feature is that the capillary body part 10 and the graded index lens 20 are in a state of being welded (fused). Moreover, in the capillary-type lens array 1, the capillary body part 10 and the graded index lens 20 may be joined with an adhesive.

Figure 2B:
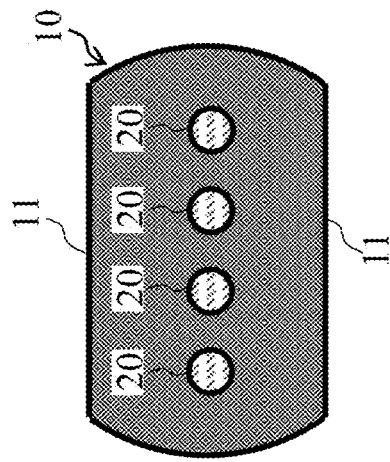
FIG. 2 shows an example form of a cross-sectional shape of the capillary-type lens array.
Figure 2D:
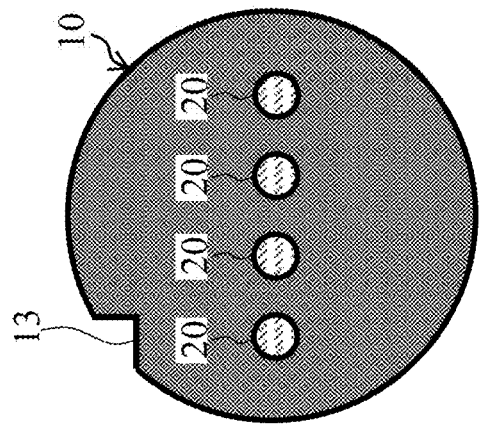
Figure 2A:
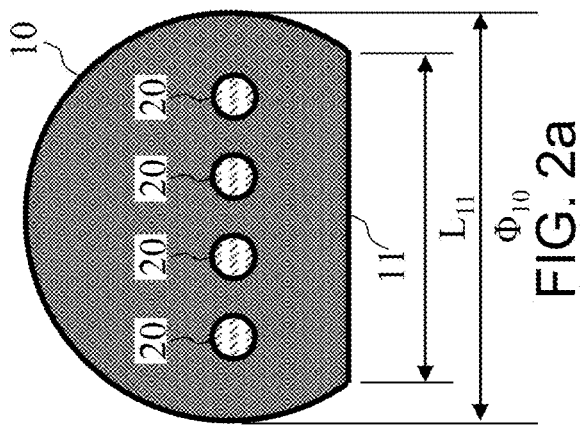
Figure 2C:
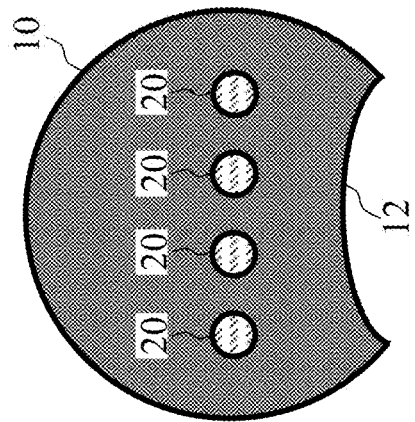

In FIG. 1, the capillary body part 10 has a circular cross-sectional shape, but the present disclosure is not limited to this. For example, the present disclosure also includes shapes other than a circular shape, such as: one in which one portion of an arc is made to be a straight line (string) 11 as shown in FIG. 2(a); one in which two portions are made to be straight lines (strings) 11 as shown in FIG. 2(b); one in which one portion of the arc is made to be an arc 12 having a smaller radius as shown in FIG. 2(c); and one in which one portion is made to be a notch 13 as shown in FIG. 2(d), for structural and directional design criterion of connecting.

Further, the capillary-type lens array according to the present disclosure may be arranged in parallel with side surfaces of the plurality of the capillary body parts 10 in contact with each other. For example, a plurality of the capillary-type lens arrays 1 shown in FIG. 2(b) may be arranged in parallel in contact with each other at a surface of the straight line 11. In the present disclosure, since the graded index lens 20 is arranged at a predetermined position in the capillary body part 10, the number of lenses can be easily increased by overlapping the side surfaces of the capillary body part 10.

For connection with an optical fiber, an outer diameter $\Phi_{10}$ of the capillary body part 10 is larger than 0.25 mm, which is an outer diameter of a standard primally coated optical fiber, and is preferably twice or more of 0.25 mm when considering a case of connecting two or more cores. Therefore, the outer diameter of the capillary body part 10 in the present disclosure is preferably 0.5 mm or more.

Further, since the capillary body part 10 has rigidity, the outer diameter $\Phi_{10}$ of the capillary is to be an important factor. Regarding to a length $L_{10}$ of the capillary, bending stress or tensile stress generated in the capillary when stress is applied should be equal to or less than a breaking strength of the glass.

In an optical component having a relatively small outer diameter as in the present disclosure, stress by bending becomes a problem rather than tensile stress. In Paragraph 5.4.3.3 of GR-1209-CORE (4th edition, published in 2010), which is the international standard for passive optical components, when stress is applied to an optical fiber connected to an optical component in a perpendicular direction, and a resistance of the optical component and the optical fiber is defined. As a prerequisite for this, the optical component itself needs to be resistant to bending stress generated by 90° bending.

Assuming a case where an optical component is connected to one side of the capillary-type lens array 1 having the length $L_{10}$ and an outer diameter $d_1$, and an optical fiber is connected to the other side, when the optical fiber has a stress F in a direction of 90 degrees with respect to the capillary-type lens array 1, bending stress generated in the capillary-type lens array 1 can be determined by the following equation.

(Formula 1)

$$\sigma_{max} = M/Z \quad (1)$$

$\sigma_{max}$: Breaking stress [N/m$^2$], M: Bending moment [N·m], Z: Section modulus [m$^3$]

Here, assuming that the cross-sectional shape has a capillary outer diameter $d_1$ and a hole diameter $d_2$, the section modulus Z is expressed by the following equation.

[Formula 2]

$$Z = \frac{\pi}{32} \frac{d_1^4 - d_2^4}{d_1} \quad (2)$$

Figure 3:
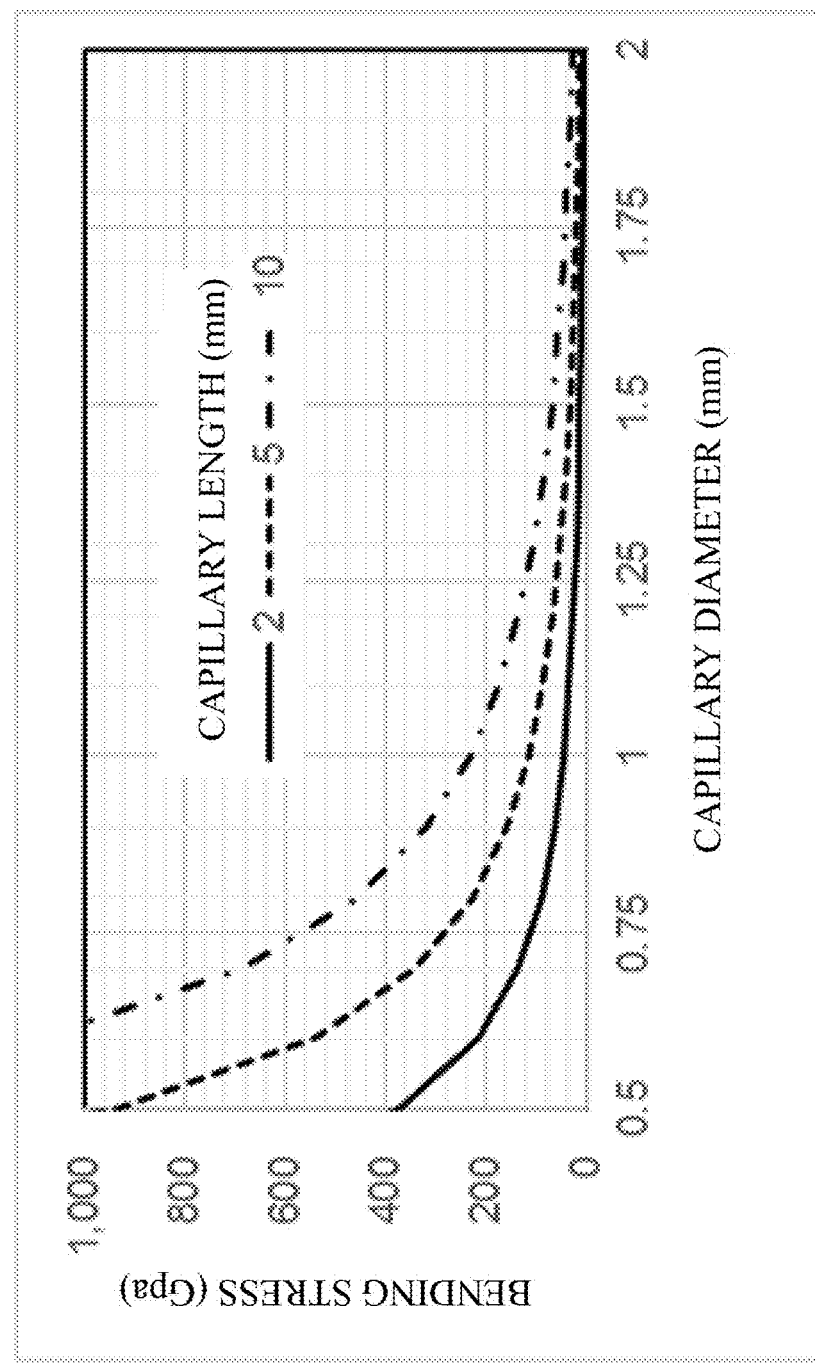
FIG. 3 shows an example of bending stress with respect to a capillary diameter.

FIG. 3 shows a result of calculating generated bending stress from the above Equations (1) and (2) with the stress F set to 0.23 kgf (2.2N), which is the requirement in Paragraph 5.4.3.3 in GR-1209-CORE.

A bending strength of quartz glass is 2000 GPa or more in theory, but a design strength is about 100 to 200 GPa, which is one tenth to one several tenth thereof, and the outer diameter $\Phi_{10}$ of the capillary 10 needs to be about 0.6 mm when the length $L_{10}$ of the capillary 10 is 2 mm in order to satisfy the conditions of at least the side pull test. Accordingly, the outer diameter $\Phi_{10}$ of the capillary 10 needs to be at least 0.5 mm or more, and preferably 0.6 mm or more.

FIG. 1 shows a structure in which four graded index lenses 20 are included in a row in the capillary body part 10, but it is illustration of a representative example, and the present invention is not limited to this.

Further, a lens diameter $\Phi_{20}$, which is an outer diameter of the graded index lens 20, is only required to be equal to or larger than a mode field diameter of transmitted light, and is preferably in a range of 50 μm to 500 μm. In addition, a lens interval $P_{20}$, which is a center-to-center distance of the graded index lenses 20, is to be equal to or larger than a length obtained by adding 30 μm to ½ of the lens diameter $\Phi_{20}$ in consideration of cross talk, but is preferably to be an integer multiple of 80 μm, 127 μm, and 250 μm, which are general intervals of optical fibers to be connected. Further, the lens intervals $P_{20}$ are preferably equal intervals, but may be unequal intervals if necessary.

As shown in FIG. 4, cases are exemplified where the graded index lenses 20 are arranged in one line at equal intervals, arranged in one line at unequal intervals, and arranged in two dimensions, with respect to the capillary body part 10. The arrangement shown in FIG. 4(d) allows 30 pieces or more of the graded index lens 20. Further, as shown in FIG. 4(d), a through hole 16 into which a guide pin is to be inserted may be provided. Moreover, the capillary body part 10 may be formed in a shape as shown in FIG. 4(d), and the capillary-type lens array 1 may be used as an MT connector.

At a time of use as an optical component thus obtained, the capillary body part 10 is appropriately cut to a length $L_{10}$ according to the purpose, on the basis of an optical period P (pitch) defined by the following equation.

(Formula 3)

$$n^2(r) = n^2(0)\{1-(gr)^2\} \quad (3)$$

$$P = 2\pi/g \quad (4)$$

Here, n(r): a refractive index at a distance r from a lens axis of the graded index lens 20, n(0): a refractive index of a lens central axis of the graded index lens 20, g: a refractive index distribution constant, r: a distance from the lens axis of the graded index lens 20, and P: an optical period of the graded index lens 20. For example, when "n" is a positive integer, the length $L_{10}$ is set to ((¼)+n) pitch. This causes light incident on the center of the graded index lens 20 to become parallel light and exit from the graded index lens 20.

Note that the length $L_{10}$ is not limited to ((¼)+n) pitch. The length $L_{10}$ may be ((½)×n) pitch. Further, the graded index lens 20 may be used as a part of a combination of a plurality of optical lenses. In this case, the length $L_{10}$ is a pitch length according to a design of the plurality of optical lenses. Therefore, the length $L_{10}$ can be a value deviated from the ((¼)+n) pitch or the ((½)×n) pitch.

Further, the pitch lengths of the plurality of the graded index lenses 20 may be the same, but may also be different. For example, the plurality of the graded index lenses 20 have a pitch length corresponding to a position of the graded index lens 20 in a cross section of the capillary body part 10. The pitch length can be adjusted by varying the length $L_{10}$, the refractive index distribution constant, or a combination of these. Further, in the present disclosure, instead of a part of the graded index lens 20, a step-index lens (not shown) may be covered with the capillary body part 10.

In the capillary-type lens array 1 of the present embodiment, since a capillary and an optical fiber having a lens function are integrally produced, there is no positional variation due to tolerance of a capillary inner diameter at a time of inserting optical fiber, and component accuracy of the optical functional component can be enhanced. Furthermore, the capillary-type lens array 1 of the present embodiment can achieve cost reduction by reducing an assembling process with an adhesive.

Second Embodiment

FIG. 5 is a view showing a form of a capillary-type lens array composite component according to the present embodiment. In a capillary-type lens array composite component 2 according to the present embodiment, the capillary-type lens array 1 according to the first embodiment is connected to an inorganic glass capillary 50. In the capillary 50, a hole 60 is arranged corresponding to a graded index lens 20 contained in the capillary body part 10.

Similarly to the capillary-type lens array 1, the capillary-type lens array composite component 2 may be arranged in parallel with side surfaces of a plurality of the capillary body parts 10 and the capillaries 50 in contact with each other. In the present disclosure, since the hole 60 is arranged at a predetermined position in the capillary 50, the number of the graded index lenses 20 and the holes 60 can be easily increased by overlapping the side surfaces of the plurality of the capillary body parts 10 and the capillaries 50.

Effects of the capillary-type lens array composite component shown in FIG. 5 will be described. In FIG. 5, an optical connection component is configured such that a lens length $L_{10}$ of the graded index lens 20 contained in the capillary-type lens array 1 is set to (¼+n) pitch (n: integer), and an optical fiber subjected to coating removal is inserted into the hole 60. A light beam having passed through a center of one lens end of the graded index lens 20 is guided through the lens length $L_{10}$ with (¼+n) pitch, and the light is emitted as parallel light. A beam radius r at that time is expressed by the following equation.

$$r=(\theta/2)/(n_0 \cdot g) \quad \text{(Formula 4)}$$

Here, θ is an incident divergence angle to the graded index lens 20, $n_0$ is a central refractive index of the graded index lens 20, and g is a refractive index distribution constant of the graded index lens 20.

In optical connection, an influence of loss due to a light beam diameter (more precisely, a mode field diameter) when there is no positional deviation is expressed by the following equation.

$$\eta=((2 \cdot W_1 \cdot W_2/(W_1^2+W_2^2))^2 \quad \text{(Formula 5)}$$

Here, η is a connection efficiency, and $W_1$ and $W_2$ are light beam diameters.

From the above equation, it can be seen that, as two light beam diameters to be connected are closer, the connection efficiency becomes higher and the loss becomes smaller. Therefore, by enlarging the light beam diameter with the graded index lens 20 for which optimum parameters have been selected, and enlarging to an extent equal to the MFD diameter of the optical fiber placed in the hole 60, connection loss can be reduced.

Figure 6:
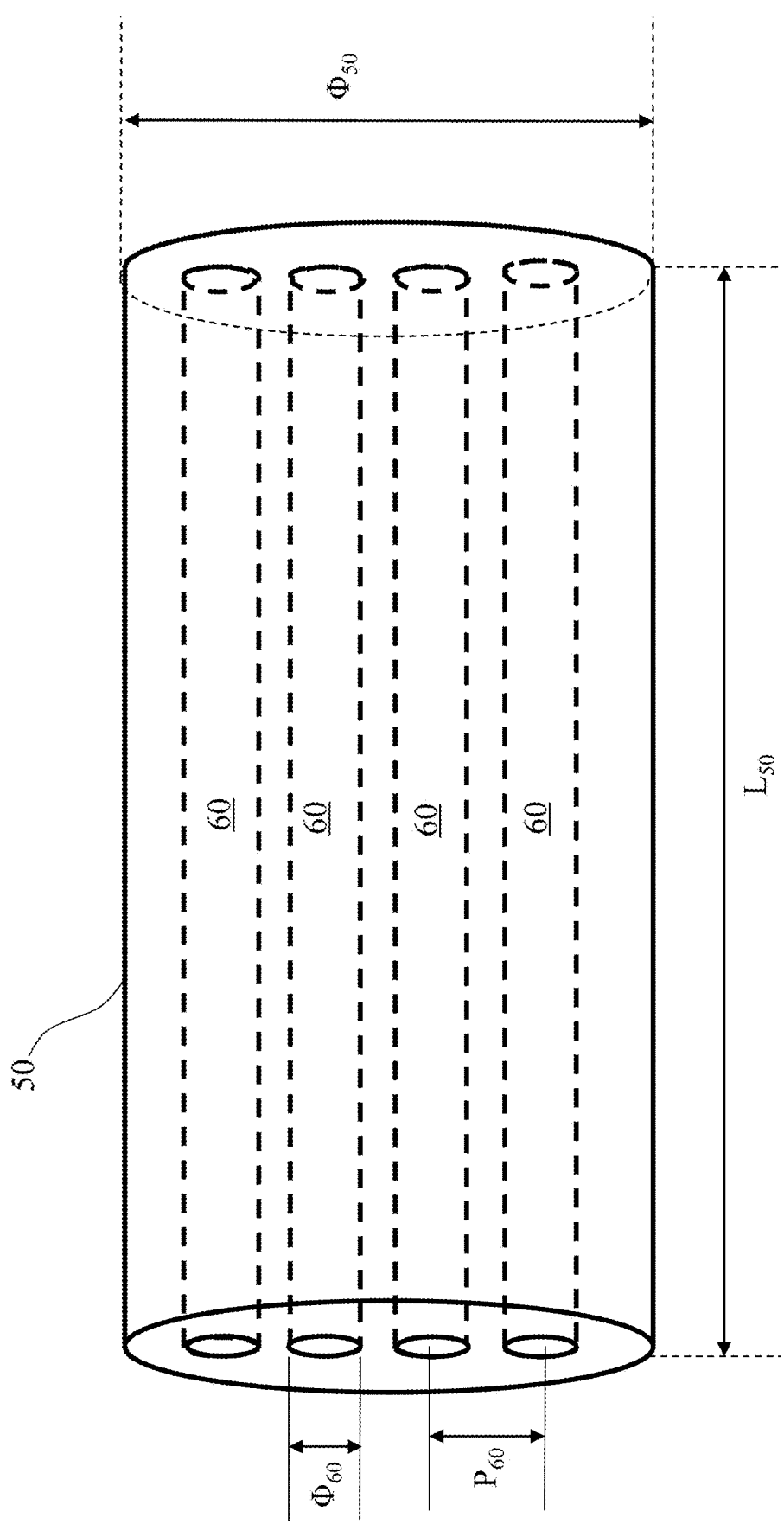
FIG. 6 shows an example of the capillary.

FIG. 6 shows an overall view of the capillary 50. The capillary 50 is produced by heating and drawing with use of a base material equivalent to that of the capillary body part 10 without inserting a graded index lens. An outer diameter $\Phi_{50}$ of the capillary 50 is preferably equal to or larger than the outer diameter $\Phi_{10}$ of the capillary body part 10. Therefore, the outer diameter $\Phi_{50}$ is preferably 0.5 mm or more, and more preferably 0.6 mm or more. An inner diameter $\Phi_{60}$ of the hole 60 is equal to a lens diameter $\Phi_{20}$, which is an outer diameter of the graded index lens 20, or larger than the lens diameter $\Phi_{20}$ by several μm, since the optical fiber subjected to coating removal is to be inserted.

As a method of producing the capillary-type lens array composite component by integrating the capillary 50 and the capillary body part 10, in addition to a typical method of bonding with use of an adhesive, there is a method of performing discharge fusion on the capillary 50 and the capillary body part 10 with a commercially available fusion splicer, in a case where an outer diameter $D_{50}$ and a shape are coincide with those of the capillary body part 10.

There is obtained a capillary-type lens array composite component by joining the capillary 50 with polished end face and the capillary body part 10 with polished end face in advance, using with an adhesive as described above. In this case, when a capillary diameter is larger than a normal optical fiber such as 0.5 mm or more, a mechanical strength after joining can be obtained since the bonding area is large. Whereas, in a case of fusing the capillary 50 with the capillary body part 10, end faces of the members are polished in the same way as the adhesive connection, and then subjected to fusion splicing with a commercially available fusion splicer for large-diameter optical fibers (for example, FSM-100 manufactured by Fujikura Ltd.). In this case, connection is possible up to an outer diameter of 2 mm.

By inserting an optical fiber (not shown) subjected to coating removal and polished on an end face into the hole 60 of the capillary 50 thus obtained, a highly accurate optical fiber component having a collimating function at a front end can be easily obtained. In the production description of the conventional capillary-type lens array composite components so far, a description has been given to a method of connecting the capillary 50 to the capillary body part 10, and then inserting the optical fiber subjected to coating removal into the capillary 50, but it is also possible to take a method of inserting the optical fiber subjected to coating removal into the capillary 50, and then connecting to the capillary body part 10.

Third Embodiment

Figure 7:
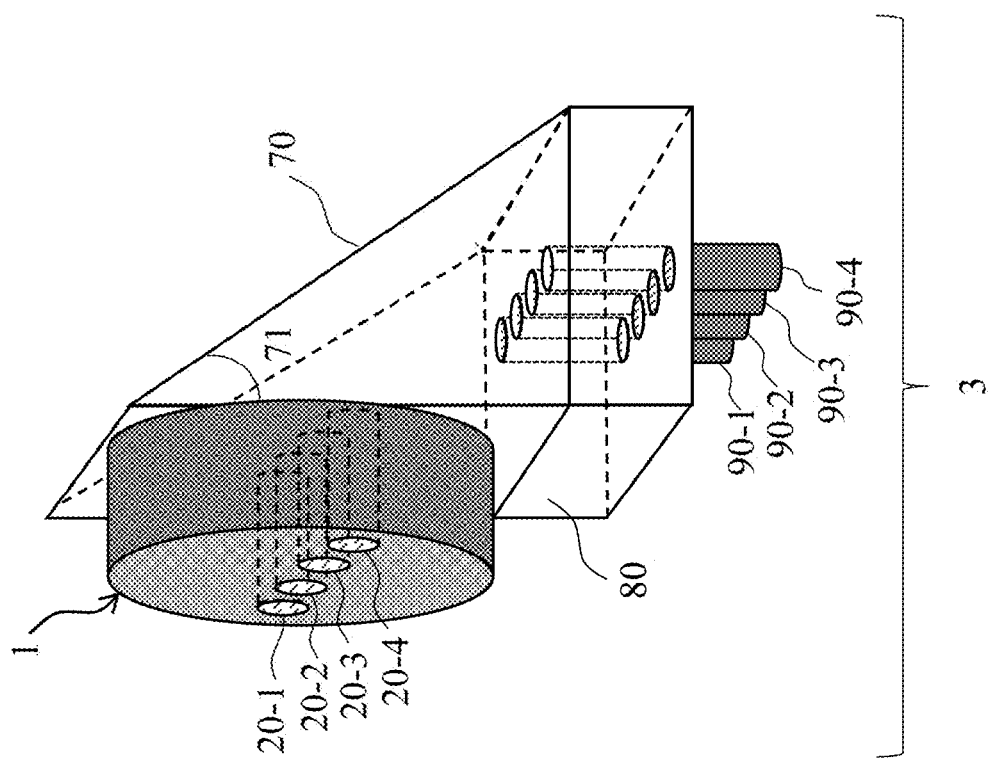
FIG. 7 shows an example of a configuration of a capillary-type lens array composite component in which an optical component having a direction changing function is combined with the capillary-type lens array.

FIG. 7 shows an example of a configuration of a capillary-type lens array composite component according to the present embodiment. In a capillary-type lens array composite component 3 according to the present embodiment, the capillary-type lens array 1 described in the first embodiment is combined with an optical component having a direction changing function.

Specifically, the capillary-type lens array 1 is disposed on one surface of a right angle prism 70, and a fiber aligning member 80 to be joined to the prism is disposed on the other surface of the right angle prism 70. The fiber aligning member 80 holds optical fibers 90-1 to 90-4 in a state where the optical fibers 90-1 to 90-4 are aligned such that light from graded index lenses 20-1 to 20-4 refracted by the right angle prism 70 is incident on the optical fibers 90-1 to 90-4.

Figure 8:
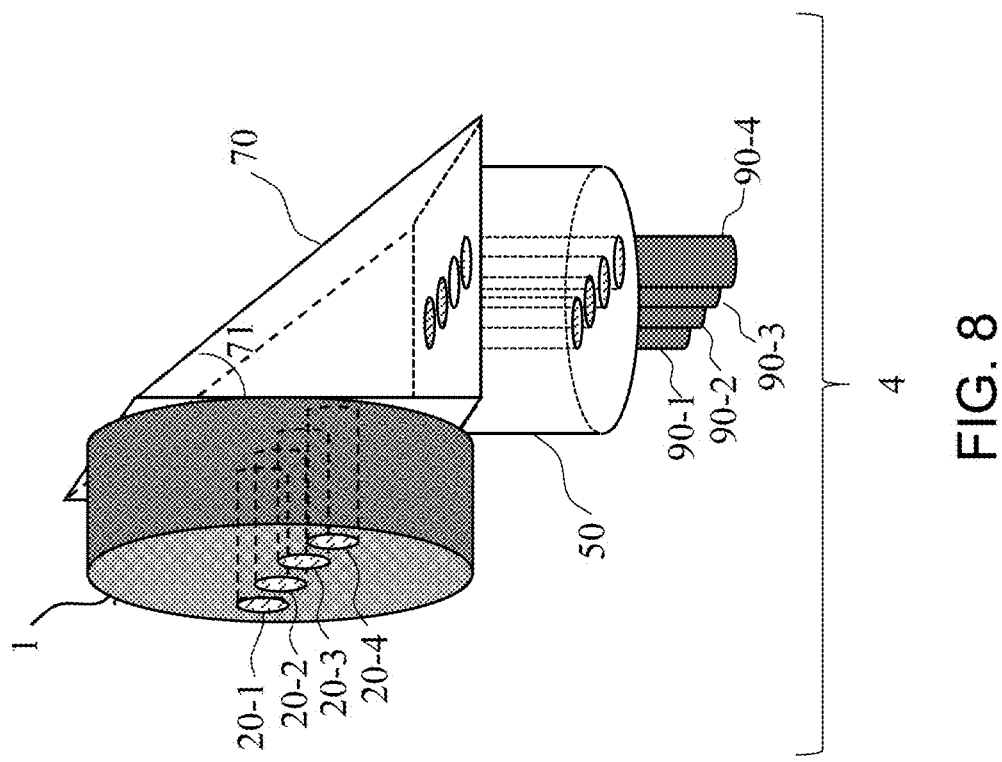
FIG. 8 shows the first example of a configuration of a capillary-type lens array composite component in which the capillary-type lens array is combined with an optical component having a direction changing function and a capillary having a pigtail.

FIG. 8 shows a specific example of a configuration of a capillary-type lens array composite component according to the present embodiment. In a capillary-type lens array composite component 4 shown in FIG. 8, a capillary 50 is disposed in place of the fiber aligning member 80. By inserting the optical fibers 90-1 to 90-4 into holes 60 of the capillary 50 and connecting to the right angle prism 70, light from the graded index lenses 20-1 to 20-4 reflected by the right angle prism 70 and incident into the optical fibers 90-1 to 90-4.

In the capillary-type lens array composite component 4 shown in FIG. 8, an optical path length in the right angle prism 70 in the graded index lenses 20-1 to 20-4 is the same as each other, but the present embodiment is not limited to this. For example, in a capillary-type lens array composite component 5 shown in FIG. 9, an optical path length in the right angle prism 70 is different for each of the graded index lenses 20-1 to 20-4.

As compared with a conventional optical component having a direction changing function, the capillary-type lens array composite component according to the present embodiment is very small and fits in a cube about 3 mm on a side. Meanwhile, the optical component having the direction changing function is not limited to the right angle prism 70, but any optical component with direction changing function can be used.

Fourth Embodiment

Figure 11:
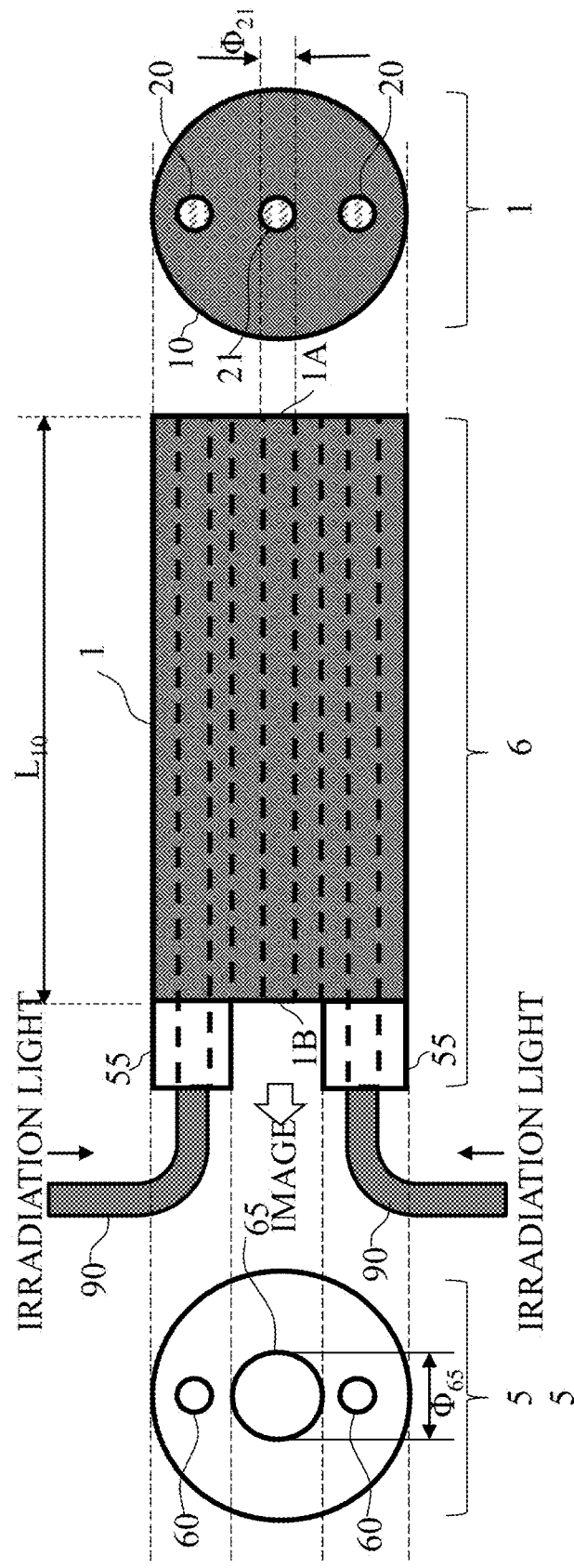
FIG. 11 shows an example of a configuration of a capillary-type lens array composite component according to a fourth embodiment.

FIG. 11 shows an example of a configuration of a capillary-type lens array composite component according to the present embodiment. A capillary-type lens array composite component 6 according to the present embodiment has a graded index lens 21 at a center of a capillary body part 10, and has an opening 65 at a center of a capillary 55.

In the present embodiment, the graded index lens 21 is used as an imaging lens. Specifically, an image input at an end face 1A at a front end of a capillary-type lens array 1 is formed on another end face 1B of the capillary-type lens array. By enlarging and inputting the image at the end face 1B to an optical imaging element with an objective lens, the image near the end face 1A can be observed on a monitor. For example, the opening 65 may be a hole, but may be disposed with an objective lens.

A lens length $L_{10}$ of the graded index lens 21 in the present embodiment is to be $L_{10}=(\frac{1}{2})\times n$ pitch (n: integer), which is a pitch length defined by Equation 4, for example. Since the length $L_{10}$ is $(\frac{1}{2})\times n$ pitch, the vicinity of the end face 1A can be observed by causing an incident image from the end face 1A at the front end to be formed on the end face 1B at a rear end, enlarged through a high magnification objective lens (not shown), and incident on an imaging element (not shown). However, the lens length $L_{10}$ does not need to be a multiple of ½ pitch, and can be set to any pitch by combining one or more lenses.

A lens diameter $\Phi_{21}$ of the graded index lens 21 may be any lens diameter, and may be, for example, the same as the lens diameter $\Phi_{20}$ or may also be larger than the lens diameter $\Phi_{20}$. Further, an inner diameter $\Phi_{65}$ of the opening 65 is preferably equal to or larger than the lens diameter $\Phi_{21}$.

An optical fiber 90 is inserted into a hole 60. Irradiation light is made incident on a graded index lens 20 with use of the optical fiber 90, and the vicinity of the end face 1A is irradiated with the irradiation light. This allows a visual field near the end face 1A to be brightened. Further, by irradiating with a fluorescence excitation wavelength, fluorescence observation can be facilitated, and also observed by simultaneously irradiation of different wavelength through the two optical fibers 90.

A length $L_{10}$ of the graded index lens 20 is preferably any pitch length other than $(\frac{1}{2})\times n$ pitch. As described above, a pitch length of the graded index lens 21 may be different from a pitch length of the graded index lens 20. For example, a refractive index distribution constant of the graded index lens 21 may be different from a refractive index distribution constant of the graded index lens 20. This enables the graded index lenses 20 and 21 to have different pitch lengths even when the graded index lenses 20 and 21 have a common length $L_{10}$.

A wavelength of irradiation light may be any wavelength, and may be a wavelength for illumination, for example, or may be a wavelength for fluorescence excitation. This enables brain diagnosis or the like with fluorescence imaging, by observing an image in the vicinity of the graded index lens 21. Furthermore, more information can be obtained by using two types of excitation light sources.

Furthermore, any number of the graded index lenses 20 and any refractive index distribution may be adopted. By using a plurality of graded index lenses with different refractive index distribution constants as the graded index lenses 20, irradiation light having an appropriate spread of light is radiated from the graded index lens 20, and a clear image can be obtained from the graded index lens 21.

Fifth Embodiment

Figure 12:
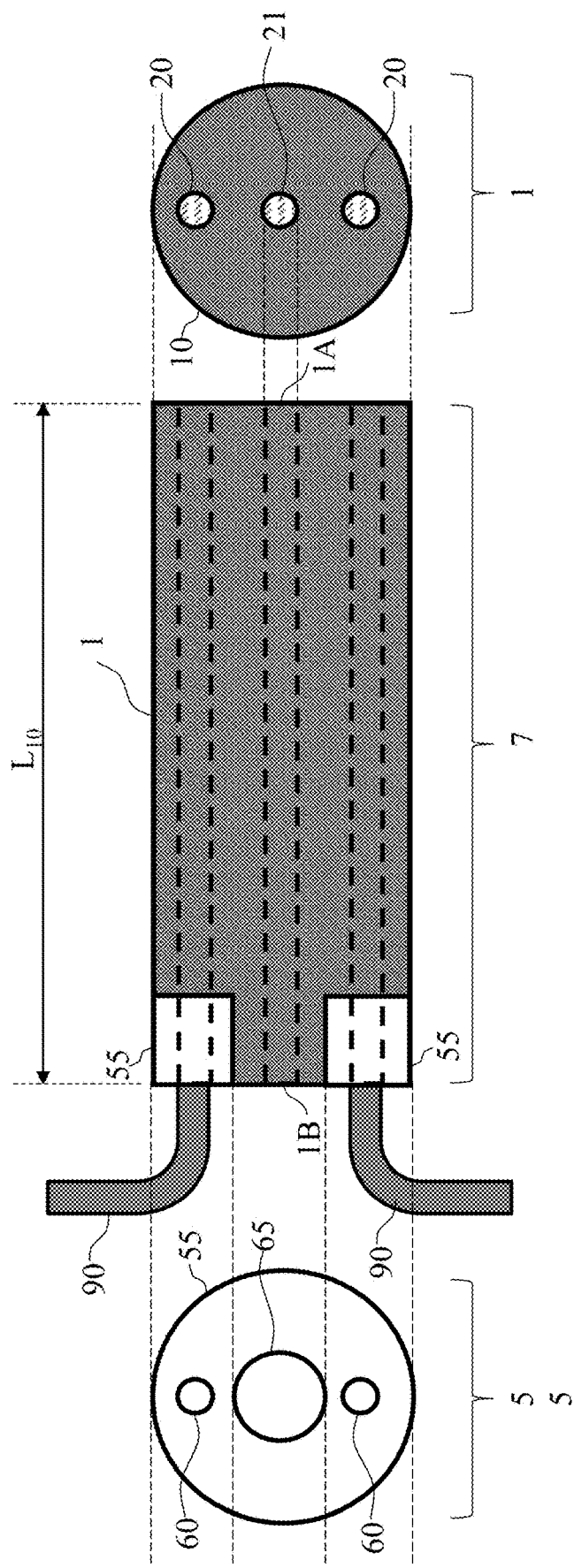
FIG. 12 shows an example of a configuration of a capillary-type lens array composite component according to a fifth embodiment.

FIG. 12 shows an example of a configuration of a capillary-type lens array composite component according to the present embodiment. A capillary-type lens array composite component 7 according to the present embodiment shows a modification of the fourth embodiment.

In the present embodiment, graded index lenses 20 and 21 have different lengths. Consequently, with use of a plurality of graded index lenses having a same refractive index distribution constant, a lens length of one graded index lens 21 among these is set to $(\frac{1}{2})n$ pitch, and a lens length of other graded index lenses 20 is set to a pitch length other than $(\frac{1}{2})n$ pitch.

By adopting such a configuration, with use of a common base material of the graded index lens, the graded index lens 21 can form a clear image on an end face 1B, and the graded index lens 20 can emit irradiation light having an appropriate spread of light from an end face 1A.

Sixth Embodiment

Figure 13:
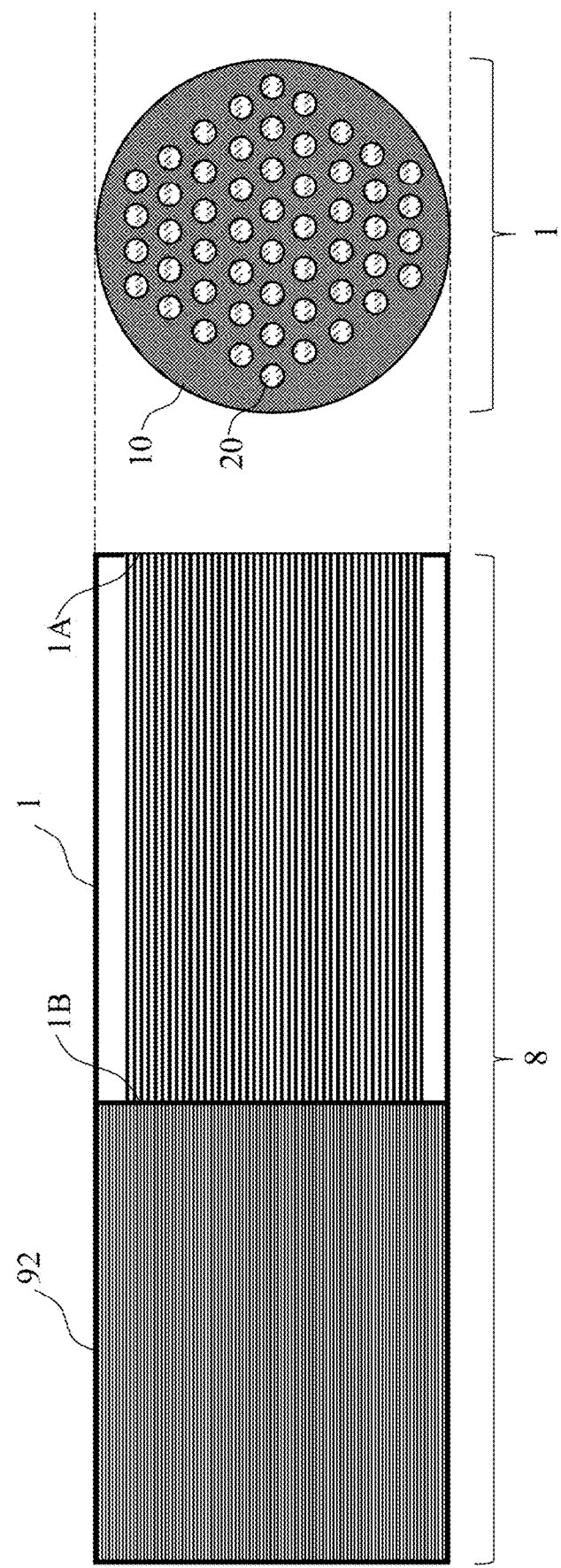
FIG. 13 shows an example of the capillary-type lens array according to the present disclosure applied to a small-diameter bundle fiber.

FIG. 13 shows an example of a configuration of a capillary-type lens array composite component according to the present embodiment. A capillary-type lens array composite component 8 according to the present embodiment includes: a capillary-type lens array 1 according to the present disclosure; and a bundle fiber 92 in which a plurality of optical fibers are bundled.

At least a part of a plurality of graded index lenses 20 of the capillary-type lens array 1 is connected to at least one optical fiber included in the bundle fiber 92. For example, one graded index lens 20 is connected to one optical fiber. Meanwhile, some of the graded index lenses 20 may not be connected to an optical fiber.

A lens length $L_{10}$ of the graded index lens 20 in the present embodiment is set to, for example, similarly to the fourth embodiment, $L_{10}=(\frac{1}{2})\times n$ pitch (n: integer), which is the pitch length defined by Equation 4. However, the lens length $L_{10}$ does not need to be a multiple of ½ pitch, and can be set to any pitch length by combining one or more lenses.

In a case where the lens length of the graded index lens 20 is ½ pitch, an image incident from an end face 1A is formed on a lens end face of an end face 1B. Therefore, an image in the vicinity of the end face 1A of the capillary-type lens array 1 is incident on the fiber bundle 92 connected to the end face 1B, as an image with one graded index lens 20 as one pixel. This allows a video in the vicinity of the end face 1A of the capillary-type lens array 1 to be captured by an imaging element (not shown) connected to the fiber bundle 92.

EXAMPLES

Example 1

An example of the capillary-type lens array 1 shown in FIG. 1 will be described.

A quartz base material having a length of ⌀30 mm×200 mm was subjected to ⌀4.5 mm hole drilling for four times with a hole interval of 7.5 mm, and a quartz base material having four penetrating holes was obtained. Next, four graded index quartz base material slightly thinner than 04.5 mm were inserted into the respective holes.

The quartz base material inserted with the graded index quartz base material and thus obtained was heated by a drawing apparatus and elongated by controlling a drawing speed such that a capillary outer diameter $\Phi_{10}$ was to be 2 mm+/−1 μm. As a result, there was obtained a capillary-type lens array having an outer diameter $\Phi_{10}$=2 mm and having graded index fiber with a lens interval $P_{20}$=0.5 mm and a lens diameter $\Phi_{20}$=300 μm, that is, a graded index lens 20 as shown in FIG. 1.

Example 2

An example of the capillary-type lens array 1 having a cross-sectional shape of FIG. 2(a) will be described.

A quartz base material with 050 mm diameter and 300 mm length is prepared. From the quartz base material, half-moon portion with chord of a 25 mm length is removed. And then, 04 mm hole drilling was performed for four times with 5 mm hole interval. As a result, a quartz base material having four through holes was obtained. Next, 10 graded index quartz base materials slightly thinner than 04 mm were inserted into the respective holes.

The quartz base material thus obtained was heated with a drawing apparatus and elongated by controlling a drawing speed. As a result, there was obtained a capillary-type lens array with cross-sectional shape similar to the shape in FIG. 2(a) having a maximum outer diameter $\Phi_{20}$=2.5 mm in which part of arc is cut off, and having graded index fiber with a lens interval $P_{20}$=250 μm and a lens diameter $\Phi_{20}$=200 μm, that is, a graded index lens 20.

Example 3

An example of the capillary-type lens array composite component 2 shown in FIG. 5 will be described.

A quartz base material having a length of 030 mm×200 mm was subjected to hole drilling for four times, and a quartz base material having four through holes was obtained. The quartz base material thus obtained was heated and drawn with a drawing apparatus and there was produced the capillary 50 having the hole 60 with an interval $P_{60}$=0.5 mm and an inner diameter $\Phi_{60}$=126 μm, and having an outer diameter $\Phi_{50}$=2 mm and a length $L_{50}$=5 mm. By inserting a single-mode fiber whose front end has been subjected to coating removal into four holes of this capillary, a capillary with a pigtail is obtained.

By polishing end faces of the capillary with the pigtail described above and the capillary-type lens array obtained by being produced similarly to Example 1, smooth joint surfaces were produced. Both joint surfaces were joined with an adhesive, and a capillary-type lens array composite component was obtained.

Example 4

The second example of the capillary-type lens array composite component 2 shown in FIG. 5 will be described.

Polishing is performed on end faces of: a capillary (outer diameter $\Phi_{50}$=2 mm, length $L_{50}$=30 mm) having four holes with an interval $P_{60}$=0.5 mm and an inner diameter $\Phi_{60}$=126 μm and produced similarly to Example 3; and a capillary-type lens array (outer diameter $\Phi_{10}$=2 mm, length $L_{10}$=30 mm) having the graded index lens 20 of a lens interval $P_{20}$=0.5 mm and a lens diameter $\Phi_{20}$=300 μm and obtained by being produced similarly to Example 1. The polished surfaces of the capillary and the capillary-type lens array were set in the fusion splicer FSM-100 manufactured by Fujikura Ltd. so as to face each other and spliced by discharge fusion, and the capillary-type lens array composite component as shown in FIG. 5 was obtained.

After the joining, a single mode fiber having a cladding outer diameter of Φ125 μm and having an end face polished is inserted into the hole 60 of the capillary 50 and fixed with a commercially available optical adhesive, and an optical component having a pigtail was obtained.

Example 5

An example of the capillary-type lens array 1 having a cross-sectional shape of FIG. 4(d) will be described.

Figure 4A:
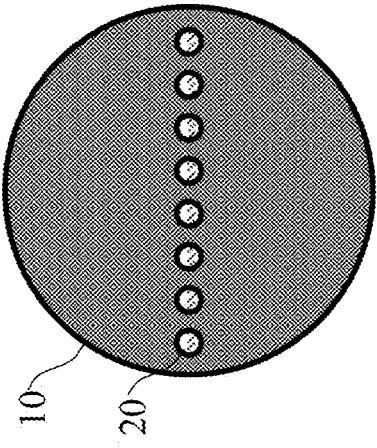
FIG. 4 shows an example form of a lens arrangement of the capillary-type lens array.
Figure 4B:
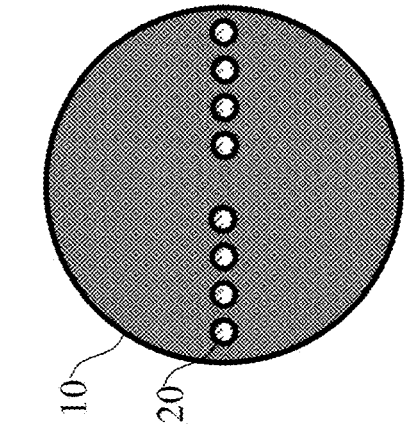
Figure 4C:
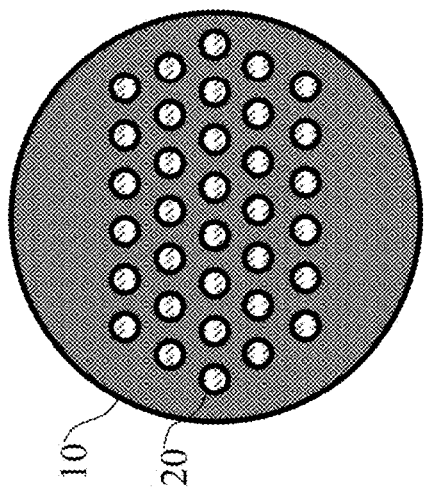
Figure 4D:
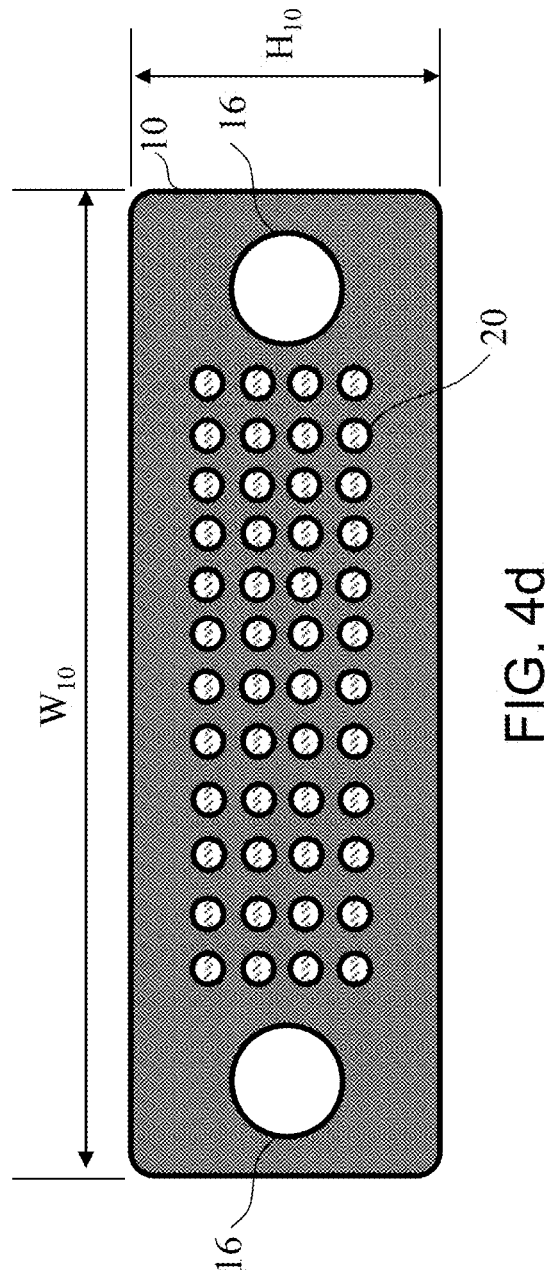

By performing, on a quartz base material having a length of 200 mm and a rectangular cross section of 64 mm×25 mm, Φ1.5 mm hole drilling with a hole pitch of 2.5 mm for a total of 48 times in 12 rows and four columns, and further performing Φ10 mm hole drilling on both sides of these hole rows, a quartz base material having the cross-sectional shape and the hole arrangement as shown in FIG. 4(d) was obtained. Next, 48 pieces of graded index quartz base material slightly thinner than Φ1.5 mm were inserted into the respective Φ1.5 mm holes.

The quartz base material thus obtained was heated with a drawing apparatus and elongated by controlling a drawing speed. As a result, there was obtained the capillary-type lens array 1 having a cross-sectional shape of the shape shown in FIG. 4(d) of width $W_{10}$=6.4 mm×length $H_{10}$=2.5 mm, and having graded index fiber with a lens interval $P_{20}$=250 μm and a lens diameter $\Phi_{20}$=150 μm, that is, a graded index lens 20.

Figure 10:
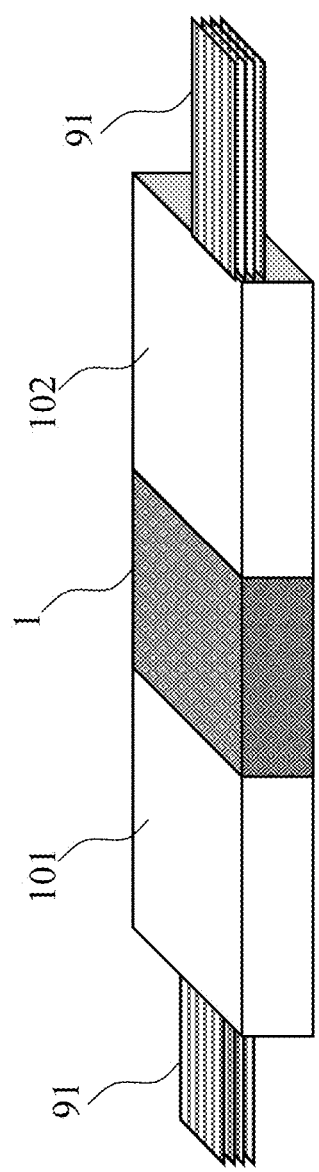
FIG. 10 shows an example of the capillary-type lens array of the present disclosure applied to connection between MT plugs.

As shown in FIG. 10, a metal pin of 00.7 mm is passed through the through hole 16 shown in FIG. 4(d) in the capillary-type lens array 1. As a result, MT ferrules 101 and 102, which were mounted with optical fibers 91 obtained by making a plurality of optical fibers into ribbons and had 48 cores with 12 rows and four columns were connected to each other via the capillary-type lens array 1.

Example 6

An example of a capillary-type lens array 1 according to the present disclosure as an MT connector will be described.

FIG. 10 shows an example in which a capillary-type lens array of the present disclosure is used to connect MT plugs. In the capillary-type lens array 1 shown in FIG. 4(d) having a cross-sectional structure of 12 rows at an interval of 0.25 mm and four columns at an interval of 0.5 mm, both surfaces are polished such that a length $L_{10}$ of the capillary 10 is to be ½ pitch. This capillary-type lens array 1 was inserted between 48 core MT plugs of the same arrangement and joined with a fitting pin, and an MT connector was obtained.

Example 7

Figure 9:
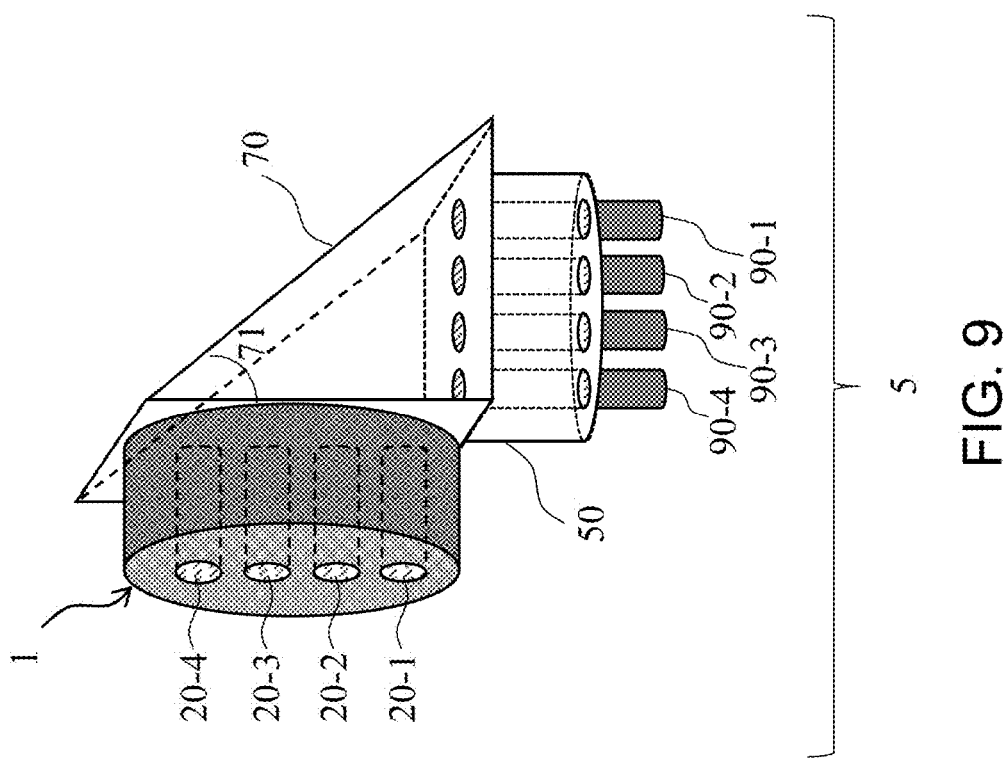
FIG. 9 shows the second example of a configuration of the capillary-type lens array composite component in which the capillary-type lens array is combined with an optical component having a direction changing function and a capillary having a pigtail.

An example of the capillary-type lens array composite component 5 shown in FIG. 9 will be described.

By polishing an end face of the capillary-type lens array 1 that is obtained by a method similar to Example 1, has an outer diameter $\Phi_{10}$=2 mm, and has four graded index lenses 20 with a lens interval $P_{20}$=0.5 mm, a length $L_{10}$ of the capillary body part 10 is adjusted to ¼ pitch.

Whereas, with a method similar to Example 3, there is produced a capillary with a pigtail obtained by inserting an optical fiber subjected to coating removal into a hole with an outer diameter $\Phi_{50}=2$ mm and an interval $P_{60}=0.5$ mm, and an end face is polished. These were joined at each of two surfaces forming a right angle of the right angle prism 70, and the capillary-type lens array composite component having a direction changing function was obtained.

Note that, in order to reduce reflected light, an reflected angle from a prism surface to the capillary-type lens array 1 is to be 82° if a prism angle 71 is set to 41°, and return of reflected light at a connection surface between the capillary-type lens array 1 and the right angle prism 70 can be reduced. In the capillary-type lens array composite component 5 having this shape, the capillary-type lens array 1 is rotated, and a plurality of graded index lenses 20-1 to 20-4 are arranged at different heights from end face positions of optical fibers 90-1 to 90-4 connected to the right angle prism 70. This enables application to usages with different heights of the plurality of graded index lenses 20-1 to 20-4. For example, from each of the plurality of graded index lenses 20-1 to 20-4, optical information from different heights around the capillary-type lens array composite component 5, for example, near-infrared light can be obtained.

Example 8

An example of the capillary-type lens array composite component 6 shown in FIG. 11 will be described.

With use of a method similar to Example 1, a capillary-type lens array having three graded index lenses 20 is produced with an outer diameter $\Phi_{10}=2$ mm and a lens interval $P_{20}=0.5$ mm, and an end face 1B is polished such that a length $L_{10}$ is to be (½)×n pitch. As a result, the capillary-type lens array 1 is produced.

Whereas, a capillary having holes with an outer diameter of $\Phi_{50}=2$ mm and an interval of $P_{60}=0.5$ mm is produced with a method similar to Example 3, a central part thereof is hollowed in a circular shape to form the hole 65, and the capillary 55 is produced. The optical fiber 90 subjected to coating removal is inserted into the hole 60 of the capillary 55 to produce the capillary 55 with a pigtail, and an end face is polished.

These capillary-type lens array 1 and capillary 55 with a pigtail were joined, and the capillary-type lens array composite component 6 was obtained.

Since a lens length of the graded index lens 21 in a central part can be set to ½ pitch, and a lens length of the graded index lens 20 on both sides can be set to a pitch length other than ½ pitch, there is a possibility that a wider area can be irradiated by using base materials with different refractive index distribution constants for the center and both sides of the graded index lens.

Example 9

An example of the capillary-type lens array composite component 7 shown in FIG. 12 will be described.

With use of a method similar to Example 1, a capillary-type lens array having three graded index lenses 20 is produced with an outer diameter $\Phi_{10}=2$ mm and a lens interval $P_{20}=0.5$ mm, and an end face 1B is polished such that a length $L_{10}$ is to be (½)×n pitch. As a result, the capillary-type lens array 1 is produced.

Whereas, a capillary having holes with an outer diameter of $\Phi_{50}=2$ mm and an interval of $P_{60}=0.5$ mm is produced with a method similar to Example 3, a central part thereof is hollowed in a circular shape to form the hole 65, and the capillary 55 is produced. There is produced the capillary 10 subjected to counter boring while leaving a periphery of the graded index lens in a central part with the same diameter (065) as the hole 65. Then, the optical fiber 90 subjected to coating removal is inserted into the hole 60 of the capillary 55 to produce the capillary with a pigtail, and an end face is polished.

These capillary-type lens array 1 and capillary with a pigtail were joined, and the capillary-type lens array composite component 7 was obtained.

Since the graded index lens 21 in a central part has a lens length of (½)×n pitch, the vicinity of the end face 1A can be observed by causing an incident image from the end face 1A at the front end to be formed on the end face 1B at a rear end, enlarged through a high magnification objective lens (not shown) and incident on an imaging element (not shown). Whereas, lens lengths of the graded index lenses on both sides are shorter than that of the central part, and it is possible to regulate an irradiation range by adjusting the lens length with counter boring.

Example 10

An example of the capillary-type lens array composite component 8 shown in FIG. 13 will be described.

By polishing an end face of the capillary-type lens array 1 that is obtained by a method similar to Example 1, has an outer diameter $\Phi_{10}=3$ mm, and has 52 graded index lenses 20 with a lens interval $P_{20}=0.25$ mm, a length $L_{10}$ of a capillary 10 is adjusted to ½ pitch. The bundle fiber 92 is connected to the capillary-type lens array 1.

INDUSTRIAL APPLICABILITY

The present disclosure can be applied to an information communication industry.

REFERENCE SIGNS LIST

1 capillary-type lens array
1A, 1B end face
2, 3, 4, 5, 6, 7 capillary-type lens array composite component
10 capillary body part
11 straight line
12 arc
13 notch
16 through hole
20, 21 graded index lens
50, 55 capillary
60, 65 hole
70 right angle prism
71 prism angle
80 fiber aligning member
90 optical fiber
91 optical fiber made into a ribbon
92 bundle fiber
101, 102 MT ferrule

The invention claimed is:
1. A capillary-type lens array comprising:
a plurality of graded index lenses; and
inorganic glass surrounding each graded index lens,
wherein a pitch length of any one of the plurality of graded index lenses is different from a pitch length of another graded index lens among the plurality of graded index lenses.
2. The capillary-type lens array according to claim 1, wherein the plurality of graded index lenses and the inorganic glass are physically fused.

3. The capillary-type lens array according to claim 1, wherein
an outer diameter of the inorganic glass is 0.5 mm or more.

4. The capillary-type lens array according to claim 1, wherein
a refractive index distribution constant of any one of the plurality of graded index lenses is different from a refractive index distribution constant of another graded index lens among the plurality of graded index lenses.

5. The capillary-type lens array according to claim 1, wherein
a pitch length of at least one of the plurality of graded index lenses is a multiple of ½ pitch.

6. A capillary-type lens array composite component comprising:
the capillary-type lens array comprising:
a plurality of graded index lenses; and
inorganic glass surrounding each graded index lens; and
a capillary made of inorganic glass and having a plurality of holes corresponding to at least a part of the plurality of graded index lenses of the capillary-type lens array, the capillary being joined to an end face of the capillary-type lens array to allow a position of an end face of the plurality of graded index lenses to be coincident with a position of the plurality of holes,
wherein a pitch length of any one of the plurality of graded index lenses is different from a pitch length of another graded index lens among the plurality of graded index lenses.

7. The capillary-type lens array composite component according to claim 6, wherein
an outer diameter of the capillary is 0.5 mm or more.

8. The capillary-type lens array composite component according to claim 6, wherein
the capillary-type lens array and the capillary made of inorganic glass are fused.

9. The capillary-type lens array composite component according to claim 6, wherein
an optical fiber is held in at least one hole of the plurality of holes in the capillary, and
an optical fiber held in the hole and the plurality of graded index lenses are connected.

10. The capillary-type lens array composite component according to claim 6, wherein
between the capillary-type lens array and the capillary, there is disposed an optical component that converts outgoing light from the plurality of graded index lenses into an optical path to the hole of the capillary.

11. The capillary-type lens array according to claim 1, wherein
a refractive index distribution constant of any one of the plurality of graded index lenses is different from a refractive index distribution constant of another graded index lens among the plurality of graded index lenses; and
wherein a pitch length of at least one of the plurality of graded index lenses is a multiple of ½ pitch.

* * * * *